Jan. 22, 1963 J. S. WACHTEL 3,074,342
COMBINATION CONVERTIBLE TOASTER AND WARMING OVEN
Filed March 24, 1959
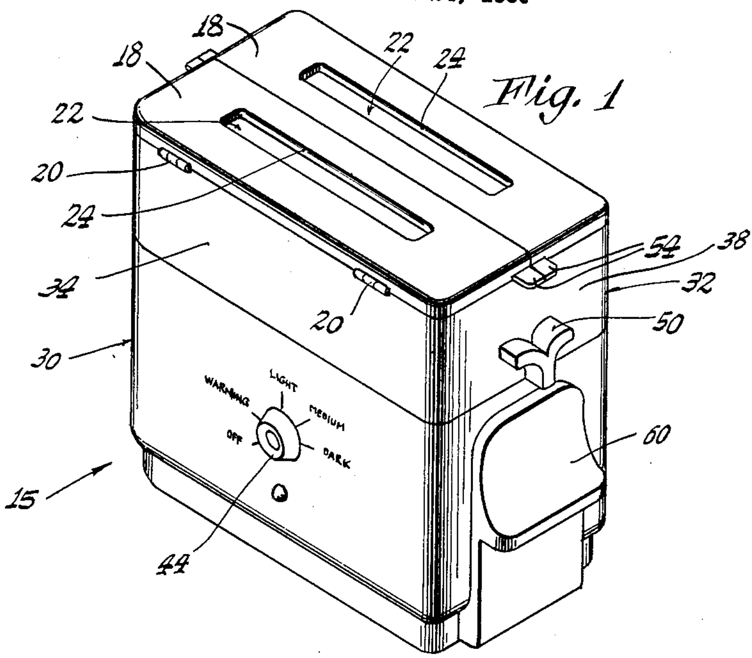
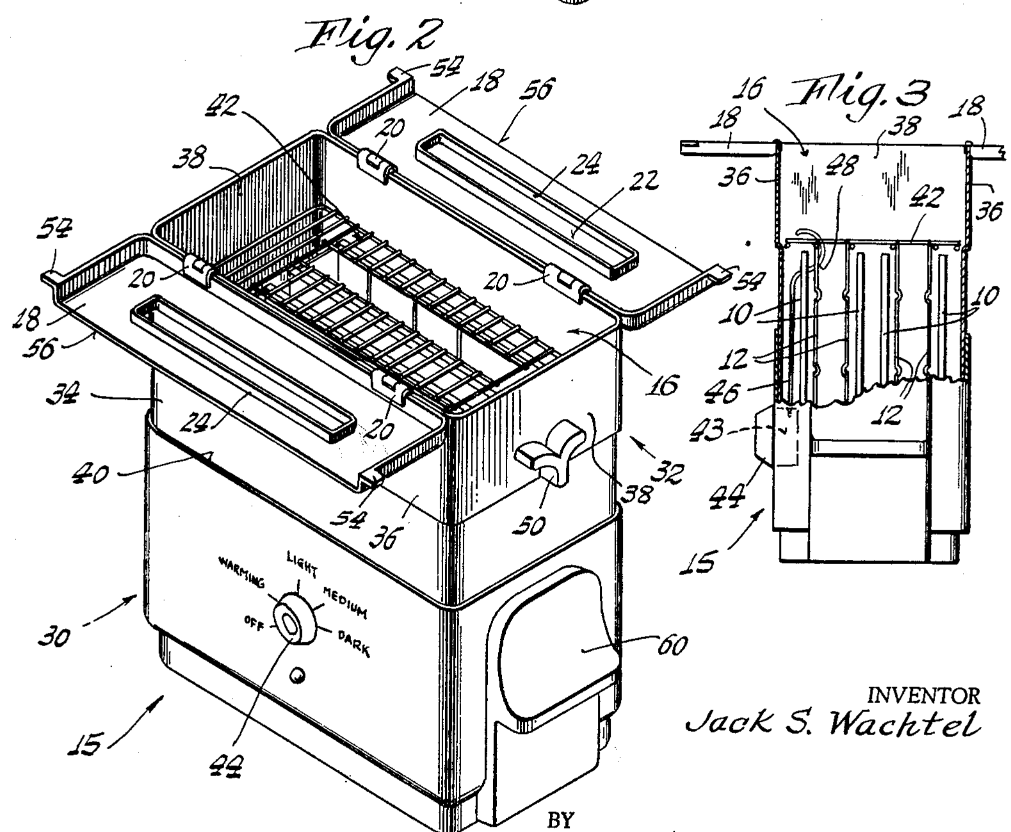
INVENTOR
Jack S. Wachtel
BY
Munn, Liddy, Daniels & March
ATTORNEYS 3,074,342
COMBINATION CONVERTIBLE TOASTER AND WARMING OVEN

Jack S. Wachtel, 48 Franklin Road, Scarsdale, N.Y.

Filed Mar. 24, 1959, Ser. No. 801,641
8 Claims. (Cl. 99—339)

This invention relates to electric toasters of the type adapted to toast slices of bread and like food products, and more particularly to toasters of this kind wherein the articles to be toasted are inserted in and removed from the top of the toaster structure.

An object of the present invention is to provide a novel and improved combination electric toaster and warming oven, which is so arranged that the device may be quickly and easily converted from one use to the other and vice versa.

A further object of the invention is to provide an improved combination convertible toaster and warming oven as above characterized, wherein a single multi-part casing is arranged to effect the conversion from toasting to warming and vice versa.

An additional object of the invention is to provide an improved electric toasting device of the type which receives and ejects the slices of bread or similar articles at the top of the casing, wherein novel guide means for the articles to be toasted are provided at the top of the device, said guide means being in the form of openable doors which are arranged so that complete access may be readily had to the interior of the casing whenever this may be desired.

Another object of the invention is to provide a novel combination convertible toaster and warming oven in accordance with the foregoing, wherein the guide means in the form of the openable doors also provide access to the warming oven space at such times that the device is converted for use as an oven.

A feature of the invention resides in the provision of an improved convertible toaster and warming oven as above characterized, wherein novel electric switch means are provided for actuation by the articles which remain warm after toasting, thereby to effect automatic energization of the heating elements of the device.

Another feature of the invention resides in the provision of a novel multi-part toaster and warming-oven casing wherein the parts thereof telescope with each other and are relatively movable for effecting the conversion of the device from a toaster to a warming oven and vice versa.

A still further object of the invention is to provide an improved convertible toaster and warming oven having all of the above features and advantages and which is nevertheless extremely simple in its construction and economical to fabricate and produce.

Other features and advantages will hereinafter appear.

In the accompanying drawings, similar characters of reference are used to designate like components and portions throughout the several views, in which:

FIGURE 1 is a perspective view of the present convertible toaster and warming oven, arranged or converted for toasting;

FIG. 2 is a perspective view of the convertible toaster and warming oven, shown as converted for oven use to warm articles or keep them warm; and FIG. 3 is a view partly in end elevation and partly in vertical section, of the convertible toaster and warming oven with the device arranged as an oven as shown in FIG. 2.

Referring particularly to the figures, the combination convertible toaster and warming oven as shown therein comprises a heating means 10 which may be constituted of a plurality of individual heating elements of any suitable type and design. Associated with the heating means 10 are vertically extending guide means 12, said guide means being arranged alongside the heating means and being adapted to support slices of bread or similar articles on edge, the said bread or articles being vertically movable along the guide means as will be understood.

Enclosing the heating and guide means 10, 12 is a casing 15, said casing having a large opening 16 at its top, through which the bread or other articles may be passed.

In accordance with the present invention, the top of the casing 15 is provided with a novel and advantageous guide means arranged to be cooperable with the guide means 12 adjoining the heating elements, for the purpose of properly guiding the bread slices or other articles when they are placed in the toaster or else ejected therefrom after the toasting has been completed. The said novel guide means is constituted as a pair of doors 18 which are movable between positions covering and uncovering the top opening 16 of the casing 15. As shown, the guide doors indicated at 18 are hingedly secured to the side walls of the casing 15 at the upper edges thereof, as by the provision of hinges 20, FIGS. 1 and 2. The open or uncovering positions of the guide doors 18 are illustrated in FIGS. 2 and 3, whereas the closed or covering positions of the doors 18 are shown in FIG. 1.

In accordance with the invention, the guide doors 18 are provided with slots 22, arranged for disposition above the spaces defined by the guide elements 12 within the casing, so as to be in registration with such spaces whereby slices of bread or the like when deposited in the slots 22 will be directed between the guides 12 so as to be properly positioned with respect to the heating elements 10. Preferably, as shown, the doors 18 are fabricated as sheet metal stampings, and the slots 22 are defined by downturned flanges 24 whereby the edges of the slots have in effect an appreciable thickness, thereby to more smoothly and reliably guide the slices which are inserted in the slots or removed therefrom.

By the provision of the openable doors 18 which constitute the guide means for the slices of bread and the like it is possible to have complete access to the interior of the casing 15 at the area above the heating elements 10 and vertical guides 12, as clearly seen in FIGS. 2 and 3. Thus, a user may readily remove any articles which are insufficient in height to project through the slots 22 or are stuck in the toaster, merely by first opening the doors 18 in the manner shown.

In accordance with the present invention, in conjunction with the guide doors 18 which are openable, there is provided a novel multipart casing construction by which the toaster may be easily and quickly converted to a warming oven. As shown, the casing 15 has a lower or base part 30 which is arranged to be supported on a table surface or the like, and has a cooperable relatively movable upper part 32, said upper part having the access opening 16 in its top to pass the slices of bread which are to be toasted or to pass any articles which are to be warmed when the device is converted for this latter purpose. The upper casing part 32 is mounted for telescopic movement on the lower part 30 between lowered and raised positions, the lowered position being shown in FIG. 1 wherein the device is converted for toasting use, and the raised position being shown in FIGS. 2 and 3 wherein the device is converted for use as a warming oven. Preferably the upper and lower casing parts 32, 30 are arranged to telescope each other, as by the provision of a lower slide portion 34 on the upper casing part 32 which may be frictionally received in the lower casing part 30. Any suitable stop means may be provided to limit the raised and lowered positions of the upper casing part 32, and in the illustrated embodiment of the invention the upper portion of the upper casing part 32 has outwardly displaced side and end walls 36 and 38 respectively, forming external shoulders with the lower slide portion 34, the said shoulders being engageable with the upper edge 40 of the lower casing part 30 to constitute a stop and to establish the lowered position of the casing part 32 when the device is converted for toasting. In the lowered position the under surfaces of the door 18 are close to or in contract with a wire grill 42 at the upper edges of the toast-receiving slots defined by the wires 12.

When, as illustrated in FIGS. 2 and 3, the upper casing part 32 is in its raised position, the outwardly displaced walls 36 and 38 will constitute an enclosure for the area which is located above the heating elements 10, the said area and displaced walls thus comprising in effect a warming oven means.

Preferably, as shown in FIGS. 2 and 3, I provide the grill or open tray 42, which is carried at the upper extremities of the vertical guides 12 to support the articles which are to be warmed in the device.

It will be understood that the toaster portion of the device of the present invention is provided with the conventional switch means (not shown). This switch means will activate a circuit warming the heating elements 10 when depressed and after a predetermined period of time set by a normal conventional bimetallic element, will cause the toast to pop in the usual fashion.

There is also provided an electric switch 43 connected in the circuit with the heating elements 10 to control the energization thereof. It may therefore be seen that in effect two switches are utilized in the present device, one for the toasting operation and one for the warming of the oven. The electric switch 43 may include a suitable thermostat under the control of a manually rotatable knob 44 or other control to effect the various heatings which may be desired for the warming purposes.

Further, in accordance with the present invention, I provide a switch actuator 46, which actuator 46 is operatively connected with the electric switch device 43. The switch actuator 46 has a laterally extending portion 48 at its upper extremity for engagement by the articles which are in the toasting mechanism, said engagement taking place either before the article is toasted or after it is toasted and it is popped up to raised position but still partly within the slot. However, bread wholly within the slot and in toasting position is too far down to press against the extending portion 48. Hence, the warming control switch 43 is not actuated while the articles to be toasted are in toasting position. The advantageous purpose of this switch actuator is to keep the articles warm after they have been toasted. When the articles have been toasted, as aforesaid, they will pop up thereby to depress the switch actuator 46 and effect a closing of the circuit through the heating means to automatically energize the same and effect a warming function. The doors 18 may or may not be closed as desired during this warming procedure.

For the purpose of enabling the device to be readily converted for either toasting or warming, handles 50 may be provided on the outwardly displaced end walls 38 of the upper casing portion 32. Also, small handles 54 may be provided on the opposite ends of the doors 18, said handles being juxtaposed to and adjoining the straight sides 56 of the doors, as clearly shown in FIGS. 1 and 2. Handles 60 may be provided on the lower casing part 30, to enable the device to be conveniently handled.

It will now be understood from the foregoing that I have provided a novel and improved combination convertible toaster and warming oven which is extremely simple in its construction while at the same time being reliable in operation. By the simple act of raising the upper casing part 32, the device is converted from a toaster to a warming oven, and lowering the upper casing part 32 will reconvert the device for toasting. Moreover, by the provision of the openable guide doors 18 complete access is had to the interior of the casing 15 as well as to the interior of the oven space when the upper case 32 is raised. Thus the guide doors 18 not only function as effective guide means for slices of bread and the like when the device is used for toasting, but also constitute oven doors when the device is converted for warming purposes and further provide complete access to the interior of the casing 15 at any time that this should be desired to free any articles therein. The warming heat is automatically turned to "on" when articles engage the switch actuator 46 for warming purposes, thereby providing the maximum convenience of operation and guarding against the device being left in energized condition when it is not in use.

Variations and modifications may be made within the scope of the claims, and portions of the improvements may be used without others.

I claim:

1. A toaster comprising an outer casing, internal guide members forming a vertical channel to support articles to be toasted, electrical heating means located alongside said guide members to toast the articles inserted therein, a tray horizontally disposed within said casing at the top of said guide members, a hinged outermost top cover attached at one edge to the wall of said casing and forming the top for said casing, said top resting upon the upper edges of the wall of said casing around the periphery thereof, said wall extending above the level of said tray to form a warming oven in the space defined by said tray, said top cover, and the upper part of the walls of said outer casing, said cover having internal edges defining a slot of substantially the same cross-sectional area as said vertical channel and disposed directly thereabove when said cover is closed, electrical circuit means connected to said electrical heating means to control the latter to provide heat for toasting articles inserted in said vertical channel; and separate electrical circuit means connected to said electrical heating means to control the latter separately to provide heat for said warming oven.

2. In a self-contained toaster unit, heating means, guide means arranged in cooperable relationship to the heating means to support articles to be toasted, a supporting tray disposed over the heating means on which articles may be placed for warming, a multi-part casing enclosing said heating means, guide means and tray, said casing having a base part adapted to be supported on a table surface or the like and having an upper part movable with respect to the base part and enclosing the said tray, said upper part having a hinged top with internal edges defining an access opening directly over and aligned with said guide means to pass articles to be toasted, engagement means mounting the upper part of the base part for holding the upper part in raised position, said upper part when in its raised position enclosing an area above the said tray in which the articles to be warmed may be placed, the two parts of the casing telescoping into each other and arranged to effect a continuity of the casing walls both when the upper part is in either its raised or in its lowered position, said upper casing part having an outwardly offset portion arranged to be flush with the walls of the lower casing part when the upper part is in its lowered position, and handles carried by the outwardly displaced upper portion of the said upper casing part.

3. In a self-contained toaster unit, heating means, guide means arranged in cooperable relationship to the heating means to support articles to be toasted, a supporting tray disposed over the heating means on which articles may be placed for warming, a multi-part casing enclosing said heating means, guide means and tray, said casing having a base part adapted to be supported on a table surface or the like and having an upper part movable with respect to the base part and enclosing the said tray, said upper part having a hinged top with internal edges defining an access opening directly over and aligned with said guide means to pass articles to be toasted, engagement means mounting the upper part of the base part for holding the upper part in raised position, said upper part when in its raised position enclosing an area above the said tray in which the articles to be warmed may be placed and a switch means for controlling the energization of the heating means, and in which there is a movable switch operator disposed at the said tray and adapted to be actuated by articles placed on the tray, thereby to close the circuit through the heating means so as to energize the latter.

4. The invention as defined in claim 3, in which the switch actuator comprises a vertical rod having a laterally extending portion at its upper extremity, said laterally extending portion being arranged for engagement with the said articles which are to be warmed.

5. A self-contained toaster unit comprising an outer casing, internal guide members forming a vertical channel to support articles to be toasted, electrical heating means located alongside said guide members to toast the articles inserted therein; a tray horizontally disposed within said casing at the top of said guide members, and a hinged outermost top cover attached at one edge to said casing and forming the top therefor over the top of said tray, said cover having internal edges defining a slot of substantially the same cross-sectional area as said vertical channel and disposed directly thereabove when said cover is closed, and electrical circuit means to control the heat produced by said heating means, said electrical circuit means comprising a switch having an actuator at the upper end of said vertical channel above the level of articles in toasting position in said channel and in position to be engaged by articles only partially within said channel, said switch operating when said actuator is pressed against to provide a limited amount of heat from said heating means.

6. In a self-contained convertible toaster-warming unit, heating means, vertical guide means disposed in cooperable relationship to said heating means and providing a channel to toast an article placed therein, a supporting tray atop said heating and guide means to support an article to be warmed, a multi-part casing enclosing said heating means, guide means and tray, said casing having a base part defined by upright walls and adapted to be supported on a counter or the like, said casing having an upper part likewise defined by upright walls, said last named walls comprising substantial continuations of said walls of said base part but being disposed in telescoping relation therewith, said upper part of said casing including a cover overlying said heating means, guide means and tray, said cover being formed with an opening therethrough corresponding in size and shape to the cross sectional shape of said channel and being aligned therewith, and said upper part of said casing being movable from a lowered position wherein said cover is juxtaposed to said tray to a raised position wherein said cover is vertically spaced from said tray to provide a warming oven therebetween.

7. The invention as defined in claim 6, there being means connecting said cover to a wall of said upper part of said casing for movement into and out of a casing covering position whereby to provide ready access to the interior of said casing.

8. The invention as defined in claim 6, wherein said cover comprises a pair of doors for said upper part of said casing, hinge means hingedly connecting said doors to opposite walls of said upper part of said casing for swinging movement to and from open and closed positions to provide ready access to the interior of said casing, and said doors being formed to provide at least one opening therethrough corresponding in size and shape to said channel, and said opening being aligned with said channel when said doors are in said closed positions.

References Cited in the file of this patent

UNITED STATES PATENTS

| | | |
|---|---|---|
| 825,938 | Schneider | July 17, 1906 |
| 1,955,867 | Wilkie | Apr. 24, 1934 |
| 2,030,047 | Bonzagni | Feb. 11, 1936 |
| 2,257,883 | McCarthy | Oct. 7, 1941 |
| 2,548,958 | Rosa | Apr. 17, 1951 |
| 2,689,666 | Olson et al. | Sept. 21, 1954 |
| 2,798,476 | Marion | July 9, 1957 |
| 2,851,943 | Smagula | Sept. 16, 1958 |